United States Patent Office 3,106,404
Patented Oct. 8, 1963

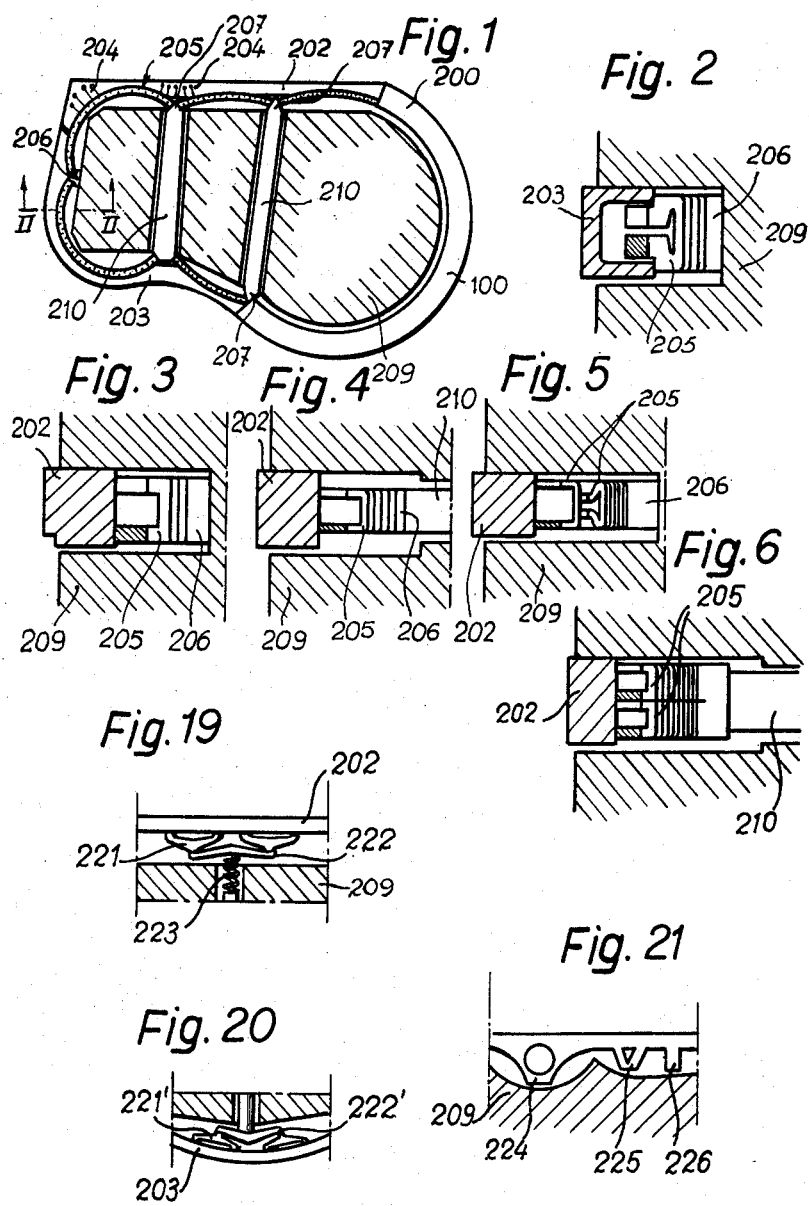

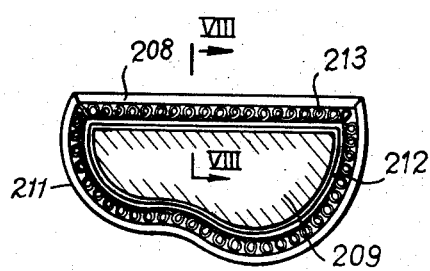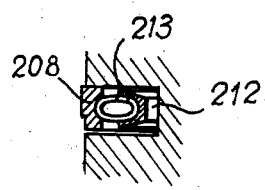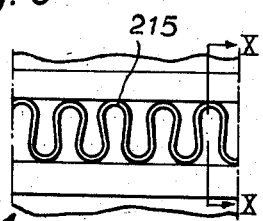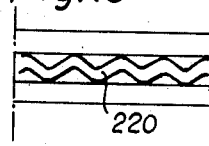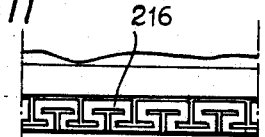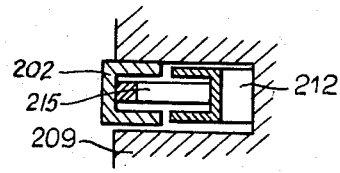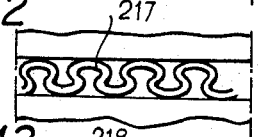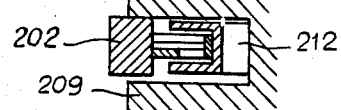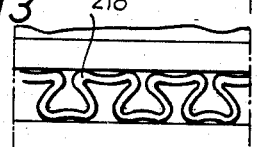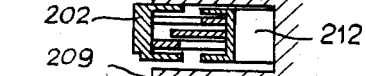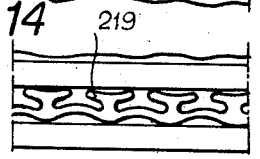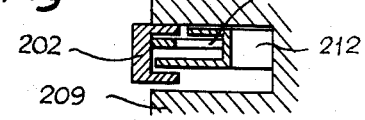

3,106,404
RECIPROCATING PISTON DRIVING OR OPERATING MACHINES
Pietro Mongitore, 1 Via Campana, Turin, Italy
Filed Jan. 4, 1961, Ser. No. 80,619
Claims priority, application Italy Jan. 16, 1960
4 Claims. (Cl. 277—148)

This invention relates to reciprocating either driving or operating machines including one or more simple or double-acting pistons of a non-circular cross-section, movable in conjugated cylinder bores.

An object of this invention is to provide an efficient and reliable seal between such a piston and cylinder.

Further objects, characteristic features and advantages of this invention will be understood from the appended description referring to the accompanying drawings given by way of a non-limiting example, wherein:

FIGURE 1 is a part sectional plan view showing a piston of non-circular cross-section comprising pressure sealing members between the piston and bore, FIGURE 2 is a cross sectional view on line II—II of FIGURE 1, FIGURES 3–6 are sectional views similar to FIGURE 1 showing further modifications of the sealing rings, FIGURE 7 is a sectional plan view of a piston similar to FIGURE 1 showing a further modification of the sealing rings;

FIGURE 8 is a sectional view on line VIII—VIII of FIGURE 7,

FIGURE 9 is a detail view of a modification of FIGURE 4.

FIGURE 10 is a sectional view on line X—X of FIGURE 9,

FIGURES 11 to 15 are detail views similar to FIGURE 9 showing further modifications of FIGURE 7, FIGURES 16 to 18 are sectional views similar to FIGURE 10 showing various modifications of the assembly of the sealing rings, FIGURE 19 is a sectional view on an enlarged scale showing a groove in a piston accommodating a sealing ring and the resilient means acting on said sealing ring according to a further modification, FIGURE 20 is a sectional view similar to FIGURE 19 showing a modification of the latter and FIGURE 21 is a detail plan view of a further modification of the sealing rings.

Referring to FIGURE 1 the piston and cylinder bore of a reciprocating driving or operating machine are of conjugated profiles, the non-circular contour of which comprises straight and curved sections.

In order to carry out a reciprocating machine including one or more pistons and bores of a cross sectional shape other than circular, having any desired straight profile the invention provides sealing rings and oil scraper rings for pressure sealing between the piston and bore.

Referring to FIGURES 1 to 21, a ring according to this invention for a piston having a plan view profile made up of arcs of a circle interconnected by straight sections, comprises at least two ring sections.

In the example shown in FIGURE 1 the piston 209 comprises sealing rings made up of three sections 200, 202 and 203, respectively.

The adjacent ends of each ring section are cut straight, inclined or with an overlap, leaving therebetween a very slight clearance to prevent jamming.

Where a section of the ring is of circular contour and extends over an angular width exceeding half a circle, such as the ring section 200 in FIGURE 1, it can be made from a sector of ordinary rings for round bores, that is, of the cambered type exerting radial pressures.

The straight or curved ring components 202 and 203 are preferably formed with internal cuts 204 adapted to improve their flexibility and are pressed against the bore wall by arcuate springs 205, which may be even multiple co-planar or juxtaposed springs, subjected to buckling stresses and of a flexibility suitable for exerting in a transverse substantially radial direction the subdivided force necessary for pressure sealing between the bore and piston. The ends of adjacent arcuate springs can be placed in direct contact with one another; however, they preferably bear on stationary or movable extensions 206, 207, respectively.

The movable extensions 207 comprise the ends of rods 210 formed with open bearing surfaces, said rods being slidably mounted in through holes in the body of the piston 209. Through the possibility for translational movement of the rods 210 in a radial direction, the various ring components can self-adjust themselves by movement in a radial direction without varying the leaf spring load, so that the springs are not subjected to fatigue as a result of lateral shaking of the piston.

The ring components are preferably made of a U-shaped section as shown, in FIGURE 2. However, this shape should not be understood as a limitation, for the rings can be of substantially rectangular cross-sections, as shown in FIGURES 3 to 6.

FIGURES 7 and 8 show a piston comprising a sectional ring, the sections 208, 211 of which comprise a straight portion and a curved portion. The ring components 208, 211 are radially pressed against the bore by the bending reaction of the turns of spring 213 of a helical or flattened helical shape.

According to a further modification instead of adopting a helical spring, the spring can be bent to serpentine shape 215, see FIGURE 9. Such serpentine spring can be obtained by bending a steel wire or strip, or can be sheared according to a pattern from sheet metal and, if necessary, bent.

Springs of the latter type are denoted by 215 to 220 in FIGURES 9 to 15.

The above helical or serpentine springs preferably bear on rings 212 mounted with a suitable clearance in the piston groove. The rings 212 can be of any desired form; according to a preferred embodiment they are of a substantially U-shaped shallow cross section.

The serpentine springs of the sheared type are preferably mounted between the inner and outer sealing rings in a juxtaposed relationship as shown in FIGURES 16 to 18.

In the embodiments shown in FIGURES 19 and 20 the straight and curved ring sections 202, 203 are pressed by sets of beam-like articulated levers 221, 222, the inner lever 222 being biased by a spring 223 abutting the bottom of a blind hole in the piston body 209. Instead of providing a blind hole, a through hole can be bored through the piston, when the reaction on the spring 223 is effected by the diametrically opposite beam components.

For correct behaviour of the rings, the latter should be of a sufficient dimension in their cross sectional plane, to thereby reduce the width of oscillation of the ring in its groove. To this end the ring can be made in cross sectional shape with extensions 224, 225, 226 extending inwardly of the groove which is formed at said extensions with suitable recess, see FIGURE 21.

The materials of which the various ring components, namely ring sections, springs and articulated levers are made may be selected among those in use in the art. Obviously, the materials are selected depending upon possible stresses and deformation due to dynamic and thermal effects as well as upon the lubricating conditions of the piston.

What I claim is:

1. In a reciprocating driving or operating machine of the type having at least one cylinder and a piston movable in the cylinder bore, the cylinder and the piston being of non-circular, conjugated cross section, a plurality of circumferential sealing rings located in circumferential grooves of the piston, each of the rings comprising at least two flexible sections in end to end relationship, resilient means mounted floatingly around the entire circumference in said grooves for urging said ring sections against such cylinder bore, means for mounting said resilient means floatingly in a radial direction relative to the piston, said piston being provided with transverse holes communicating with said circumferential grooves, a rod slidably mounted in each hole and having ends protruding into said grooves, two opposing bearing surfaces on each of said rods, and said resilient means comprising a plurality of arcuated leaf springs disposed around the periphery of each groove, the ends of adjacent springs abutting against said bearing surfaces on said rod ends, and the middle of each spring bearing against the inner surface of said sealing ring sections.

2. A reciprocating driving or operating machine as claimed in claim 1, wherein each piston comprises a ring having a shallow U cross-section mounted with substantial radial clearance in each piston groove, an annular helical spring located by its internal portion in the trough of said shallow ring the external portion of said spring protruding from the trough of said shallow ring and bearing against the inner surface of the sealing ring sections.

3. A reciprocating driving or operating machine as claimed in claim 1, wherein each piston comprises a ring having a shallow U cross-section mounted with substantial radial clearance in each piston groove, two annular flat serpentine springs located in juxtaposition by their internal portions in the trough of each of said shallow rings, the external portions of said springs protruding from the trough of said shallow ring and bearing against the inner surface of the sealing ring sections.

4. A reciprocating driving or operating machine as claimed in claim 1, wherein each piston is provided with a plurality of transverse holes communicating with said circumferential grooves, a coiled spring axially disposed in each of said holes and having at least one end protruding into the groove and bearing against the inner surface of the said sealing ring sections.

References Cited in the file of this patent

UNITED STATES PATENTS

| | | |
|---|---|---|
| 2,257,417 | Kelley | Sept. 30, 1941 |
| 2,368,412 | Cords | Jan. 30, 1945 |
| 2,409,555 | Gadoux | Oct. 15, 1946 |

FOREIGN PATENTS

| | | |
|---|---|---|
| 974,917 | France | Feb. 27, 1951 |
| 948,826 | Germany | Sept. 6, 1956 |